United States Patent
Hurtta et al.

(10) Patent No.: US 8,218,535 B1
(45) Date of Patent: Jul. 10, 2012

(54) METHOD AND DEVICE FOR ATTACHING A USER EQUIPMENT TO A TELECOMMUNICATION NETWORK

(75) Inventors: Tuija Hurtta, Espoo (FI); Jaakko Rajaniemi, Helsinki (FI); Jonne Soininen, Helsinki (FI); Serge Haumont, Helsinki (FI); Jarmo Hillo, Espoo (FI)

(73) Assignee: Nokia Corporation, Espoo (FI)

( * ) Notice: Subject to any disclaimer, the term of this patent is extended or adjusted under 35 U.S.C. 154(b) by 2312 days.

(21) Appl. No.: 10/311,658

(22) PCT Filed: Jul. 4, 2000

(86) PCT No.: PCT/EP00/06275
§ 371 (c)(1),
(2), (4) Date: Sep. 29, 2003

(87) PCT Pub. No.: WO02/03725
PCT Pub. Date: Jan. 10, 2002

(51) Int. Cl.
*H04L 12/66* (2006.01)

(52) U.S. Cl. ........ 370/356; 370/338; 370/390; 370/401; 370/410; 370/497

(58) Field of Classification Search ............ 370/310, 370/352, 356, 401, 410, 338; 455/414, 422, 455/434, 455, 515, 437, 439, 442, 436
See application file for complete search history.

(56) References Cited

U.S. PATENT DOCUMENTS

| | | | |
|---|---|---|---|
| 6,865,169 B1 * | 3/2005 | Quayle et al. .................. 370/335 |
| 6,963,582 B1 * | 11/2005 | Xu ................................. 370/466 |
| 6,973,057 B1 * | 12/2005 | Forslow .......................... 370/328 |
| 6,978,132 B1 * | 12/2005 | Sladek et al. ............... 455/432.2 |
| 7,092,696 B1 * | 8/2006 | Hosain et al. .................. 455/405 |
| 7,408,942 B1 * | 8/2008 | Allahwerdi .................... 370/401 |
| 2001/0017844 A1 * | 8/2001 | Mangin .......................... 370/231 |
| 2001/0055291 A1 * | 12/2001 | Schweitzer .................... 370/337 |
| 2002/0036983 A1 * | 3/2002 | Widegren et al. ............ 370/230.1 |
| 2002/0057657 A1 * | 5/2002 | La Porta et al. ............... 370/331 |
| 2003/0039237 A1 * | 2/2003 | Forslow .......................... 370/352 |
| 2006/0030333 A1 * | 2/2006 | Ward et al. ................... 455/456.1 |
| 2006/0062162 A1 * | 3/2006 | Minborg ........................ 370/260 |
| 2006/0268682 A1 * | 11/2006 | Vasseur ......................... 370/216 |

FOREIGN PATENT DOCUMENTS

| | | |
|---|---|---|
| EP | 0 910 198 A2 | 4/1999 |
| EP | 1 009 176 A2 | 6/2000 |
| WO | WO 98/43446 | 10/1998 |
| WO | WO 99/37103 | 7/1999 |

* cited by examiner

*Primary Examiner* — Dwayne Bost
*Assistant Examiner* — Inder Mehra
(74) *Attorney, Agent, or Firm* — Alston & Bird LLP (57) ABSTRACT

The invention is directed to a communication network wherein a direct tunnel may be formed between a user equipment and a gateway support node, bypassing an intermediate serving support node. If, however, the gateway node should be outside of the actual communication network to which the user equipment is connected, a two-tunnel concept is used wherein a tunnel is provided between the user equipment and the serving support node. Likewise, when receiving a request for Lawful Interception, the tunnel formed between the user equipment and the gateway node is reconfigured to be directed to the serving node for guiding all user traffic and control signaling via this serving node.

47 Claims, 6 Drawing Sheets

METHOD AND DEVICE FOR ATTACHING A USER EQUIPMENT TO A TELECOMMUNICATION NETWORK

FIELD OF THE INVENTION

The present invention relates to a method and device for attaching a user equipment to a telecommunication network using a tunnel connection.

BACKGROUND OF THE INVENTION

When attaching a user equipment to a communication system based on GSM (Global system for mobile communication), for instance GPRS (general packet radio service; see for instance European standard (telecommunications series) EN 301 113) or UMTS (universal mobile telecommunications system; see for instance ETSI standard ES 201 385) standard, the user equipment usually sends an attachment request and Packet Data Protocol context activation request to a support node and will then be attached to the access network, e.g. GSM PLMN (public land mobile network) or UMTS PLMN, and connected to an external network (e.g. Internet). The access network provides the connection for instance by attributing a bearer channel. In a packet switched telecommunication system such as GPRS or UMTS, the data including user traffic data and control (signalling) data are normally sent from the user equipment to a serving support node which may send this data to a second support node, such as a gateway support node, for transmitting the communication to a receiving party which may be located in an an external network.

In addition, tunneling mechanisms are well-known especially over IP. An example of such tunneling mechanism is GTP (GPRS Tunneling protocol which in its version 1 identify a tunnel with a destination address (tunnel endpoint address, Ipv4 or Ipv6 for GTP) indicating the node of processing card handling the tunnel and a Tunnel End Point Identifier (TEID) indentifying the tunnel within this entity. Every entity sends packet with the TEID allocated by the other tunnel end and receive packets with the TEID it has itself allocated.

Usually, there is the overall tendency to reduce the traffic load in communication networks. However, different situations have to be taken into account such as a request for transmitting and receiving a communication to and from another communication network, or a request for Lawful Interception (monitoring) of a party or user equipment by a law enforcement agency authorised to monitor this party or user equipment.

SUMMARY OF THE INVENTION

The present invention aims at providing a method and device for connecting a user equipment to an external network wherein the load on the access network can be reduced, preferably, however, without negatively affecting the operability of the network or without affecting the possibility of Lawful Interception.

The present invention provides methods and/or devices as defined in the claims.

In particular, the present invention provides a method and device for connecting a user equipment to an external network through an access network having at least two support nodes wherein, under normal circumstances, the user equipment will be directly connected, via a tunnel connection, to a second support node bypassing its assigned support node.

This direct tunnel connection reduces the total traffic in the network as the first support node does not need to handle the user traffic of the user equipment under normal circumstances. In addition, this connection leads to a certain increase of the overall traffic speed as the first support node and its inherent (small) delay is bypassed.

However, in order to ensure a proper operability and functionality, the invention proposes that said first support node checks defined trigger to determine if one tunnel should be established as under normal circumstance or if two tunnels should be established as at least one defined trigger is met.

Typically in order to ensure a proper operability and functionality, the following triggers are checked:

support of special services for a given user such as CAMEL services, and check if these services would be delivered also with one tunnel;
  need to perform Lawful interception for a given user;
  Interoperability between the second support node selected and the controller such as RNC, in order to guarantee that both support same GTP tunnel version;
  Location of the second support node in another PLMN than the first support node which may determine the need of collecting charging data in the same PLMN as the first support node;
  Location of the second support node far away from the support node, in which case two tunnels may be preferred to avoid updating tunnels (due to user mobility) to a far away second support node too often. This is the principle of hierarchical mobility.

The invention is about using one or more (in any arbitrary combination) of these triggers to make the decision how many tunnels to establish. The support node should offer the possibility to use these triggers and the operator should configure which triggers are relevant to support its operation and services.

A first implementation of the invention discussed below in more detail, describes how a simple check can be used for the two last above-mentioned triggers in order to always collecting charging data in the same PLMN as the first support node and support hierarchical mobility.

In this or a further implementation of the invention, first support node checks whether or not the second support node is part of the same network as the first support node. Only in this case, the direct tunnel connection is preferably established. If the second support node should form part of another PLMN, no direct tunnel connection is provided. To the contrary, all traffic including the user data (user traffic data) and the control data is sent to the first support node which may then address the second support node (lying outside of the own network) by means of a tunnel connection or in a different customary manner. This provides the advantage of ensuring that all traffic goes to at least one support node in the network assigned to the user equipment so that all controls including charging and the like can be properly handled.

It shall be understood that the provision of one tunnel still means that two links from the user equipment are provided. One signaling linkleads from the user equipment to the first support node and transports all control data (signalling, flow) whereas the second data link is formed between the user equipment and the second support node (for instance, residing in the same PLMN) and handles all user data apart from the control data. In a system such as UMTS, this data link is made from a radio bearer from the user equipment to the RNC and from a tunnel between the RNC and the second support node. In other systems, for instance using mobile IP for mobility, the tunnel may be established between the user equipment and the second support node (Home Agent).

This dual link structure provides the advantage of directly handling the user data traffic between the user equipment and the second support node bypassing the first support node, which leads to a reduction of the delay caused thereby, and of the traffic load which would otherwise additionally have to be handled. On the other hand, the first support node always receives and transmits the control data from and to the user equipment and therefore is always aware of the user equipment activities.

In case of receiving a request for Lawful Interception of the user equipment (which may be a mobile phone, a data station such as a portable computer, or the like), the first support node is able to reconfigure the connection status of the user equipment in such a manner that furtheron user data are transferred via the first support node which will then send the data to the intercepting party, for instance via a Lawful Interception gateway (LIG) for monitoring purposes. This reconfiguration of the traffic pathes can be effected very quickly and efficiently so that the intercepted party does not recognize any surprising changes of data transmission.

In case the RNC needs to release the radio link to the user equipment (such a need may arise in UMTS to optimise the radio signaling, or to synchronise states of a UE (user equipment) out of coverage), the controller such as RNC will perform a release procedure, e.g. Iu release procedure, toward the first support node (e.g. SGSN). In such case, if one tunnel is established to a second support node such as GGSN, the first support node is able to reconfigure the connection status of the user equipment in such a manner that furtheron user data are transferred via the first support node.

Note that reconfiguring the connection status of the user equipment in such a manner that furtheron user data are transferred via the first support node refers in a GPRS/UMTS system to the PDP context modification procedure which can be used to modify the destination address of the tunnel.

DETAILED DESCRIPTION OF PREFERRED EMBODIMENTS OF THE INVENTION

Figure 1:
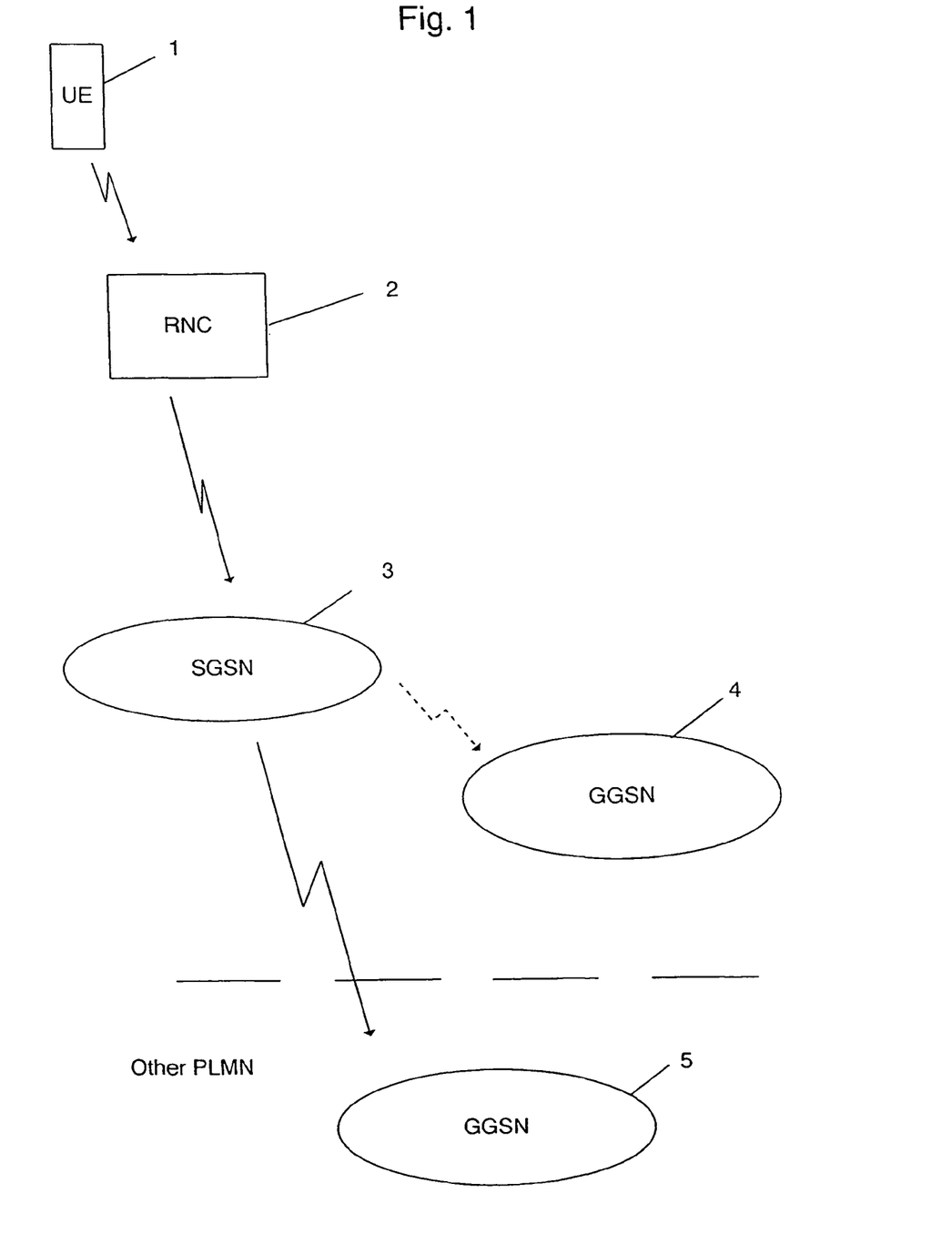
FIG. 1 illustrates a schematic embodiment of a basic structure of a telecommunication network.

FIG. 1 shows a basic structure of a telecommunication network implemented as an UMTS system. However, the network may also have any other structure of a packet switched data transmission system like GPRS, or any other appropriate system structure. The system of FIG. 1 comprises a user equipment 1 which may be a mobile phone or a data station or the like. Actually, a plurality of user equipments 1 will be present which communicate via the network. For effecting a transmission (originating or terminating a call or data transmission), the user equipment 1 transmits/receives commands and user data via a controller controlling the user equipment access, e.g. a Radio Network Controller (RNC) 2 (or a base station controller), to a first support node 3 which serves as a serving support node handling the communication between the user equipment 1 and the GGSN. The serving support node 3 may communicate with a second support node 4 such as a gateway node, or with a gateway support node 5 of another network such as a PLMN, for instance when the call/data transmission is to be sent to an external network such as public Internet or Intranet. The data traffic traverses the gateway support node.

Figure 2:
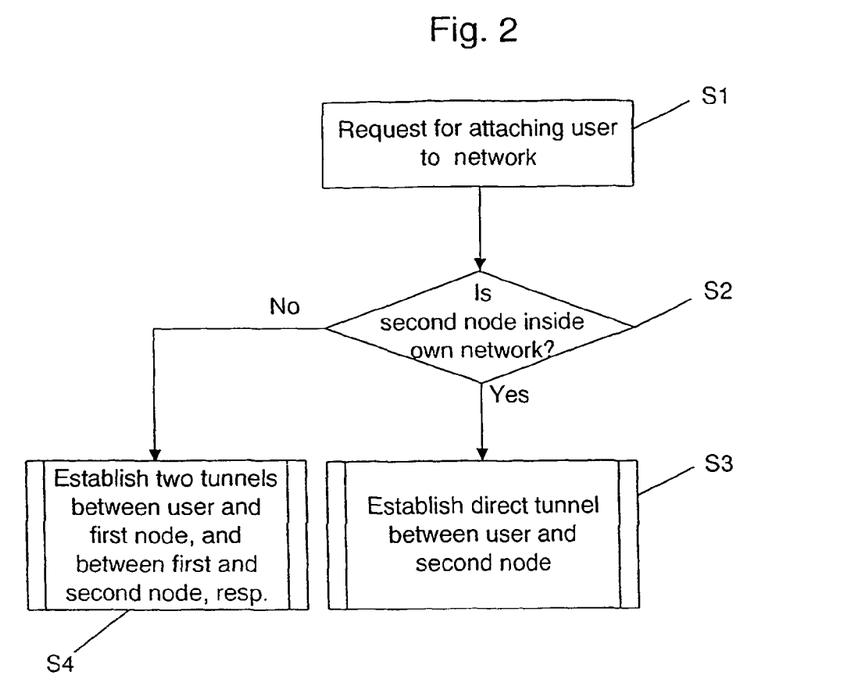
FIG. 2 illustrates a process flow in one embodiment of the invention.

FIG. 2 illustrates the basic steps of attaching a user equipment and getting a connection to an external network according to one embodiment of the invention. In step S1, the user equipment 1 (FIG. 1) sends a request for attaching and activating a PDP context, via the controller providing access for the user equipment such as RNC 2, to the serving support node 3. The support node 3 effects a check to determine if one or two tunnel should be established.

The possible checks will now be described in detail:
Support of special services for a given user such as CAMEL services, and check if these services would be delivered also with one tunnel.

The first support node such as SGSN will check from the subscriber data, if particular services are activated. A first example of service is CAMEL pre-paid and a second is SoLSA (Support of Localised Service Area).

The use of CAMEL for this user is indicated by the Camel Subscription Information, and active detection points. When receiving the PDP context activation request from the UE, the SGSN will check if a detection point is activated for this event. If not, one tunnel can be established based on this trigger. If yes, the SGSN will interrogate the Service Control Point (SCP) to learn how to proceed. If the SCP requests the SGSN to report a data volume, in a first preferred option, the SGSN establishes two tunnels, so that the data volume is accessible in its data processing part.

In a second preferred option, the SGSN first checks the capability of a second node such as GGSN to report this data volume. This is made by adding in the GTP Create PDP Context Request message an optional field "(e.g. Data Volume Threshold, as defined in relation with FIG. 5)" requesting a data volume report (based on a volume limit as defined by the SCP). If the GGSN supports such capability, it will add in the GTP Create PDP Context Response message an optional field indicating that the request for the data volume report was accepted. If this optional field is not returned by the GGSN indicating that the GGSN does not support this capability, the SGSN establishes two tunnels.

The implementation for the second service SoLSA, is based on checking from subscriber data if SoLSA is a subscribed service. If it is, the amount of data sent in different Localised Service Areas should be indicated, and only SGSN will detect when an LSA change. Therefore, the SGSN should establish two tunnels for SoLSA users.

Need to perform Lawful interception (LI) for a given user:
The SGSN checks during the attach procedure if new UE (User Equipment) should be intercepted or not. In a normal case, the SGSN always establishes two tunnels for intercepted UE so it can forward it to LIG (Lawful Interception Gateway). However, if the GGSN used supports LI and is located in the same country, the SGSN may decide to establish one tunnel (if no need to have two tunnels arises from other triggers).

Interoperability between the second support node selected and the controller such as RNC, in order to guarantee that both support same GTP tunnel version.

A particular interoperability problem arises when the RNC supports only GTP version 1 and the GGSN only GTP version 0. The SGSN detects this situation when sending a GTP create PDP context message to the GGSN using GTP version 1 and receiving "GTP message version not supported". In this case, two tunnels have to be established as GGSN and RNC are not able to communicate directly.

Location of the second support node in another PLMN than the first support node which may determine the need of collecting charging data in the same PLMN as the first support node.

A PLMN operator offering radio access to a user equipment using a GGSN in a different PLMN may or may not trust on this second PLMN operator charging information. Therefore, the SGSN should check if the GGSN belongs to a trusted PLMN from a preconfigured list of trusted PLMNs (and by default one PLMN always trust itself). If it does not belong to the list, two tunnels shall be established so the first PLMN operator can itself monitor the user data traffic.

Location of the second support node far away from the first support node, in which case two tunnels may be preferred to avoid updating tunnels (due to user mobility) to a far away second support node too often. This is the principle of hierarchical mobility.

When the user equipment is moving, it may change its serving RNC, and such change implies an update of the other tunnel end to indicate the new tunnel destination address. Such update may be heavy and create delay if the other end is situated far away. Therefore, it is not efficient to establish one tunnel toward a far away GGSN. Therefore to maintain efficient mobility, the SGSN will check if the GGSN belongs to a pre-configured list of near-by GGSN. If it does not belong to this list, two tunnels should be established.

It should be noted, that the two last checks can be combined (trusted and near-by GGSN) by having a single list of PLMNs toward which one tunnel may be created.

If none of these checks determines that two tunnels should be established, then the SGSN will establish a single tunnel.

This(ese) check(s) is(are) effected in order to ensure that the tunnel connection to be established, by the first node 3, between the user equipment 1 and the second support node 4 is at least handled by a support node situated in the same network so as to gather all information necessary for properly controlling and operating the network such as correctly calculating the call charges. When the first support node 3 detects that the call is to be transmitted to a second node 4 being situated in the same network, it establishes a direct tunnel connection between the user equipment 1 and the second support node 4 via the base station 2 but bypassing the support node 3 (step S3).

When, to the contrary, the first node 3 detects, in step S2, that two tunnels should be used (for instance the gateway support node 5 is a node of another PLMN), the process proceeds to step S4 wherein the first support node 3 prepares two tunnels, one leading from the user equipment (or the base station RNC 2) to the support node 3, and the other leading from the support node 3 to the external support node such as support node 5. The handling and preparation of tunnels as such are known processes which are defined, for instance, in European standard ETSI EN 301 347.

When using only one tunnel, the additional processing necessary when having two tunnels, and the extra node junction of support node 3 can be omitted, with a corresponding increase in speed and decrease in network load.

Figure 3:
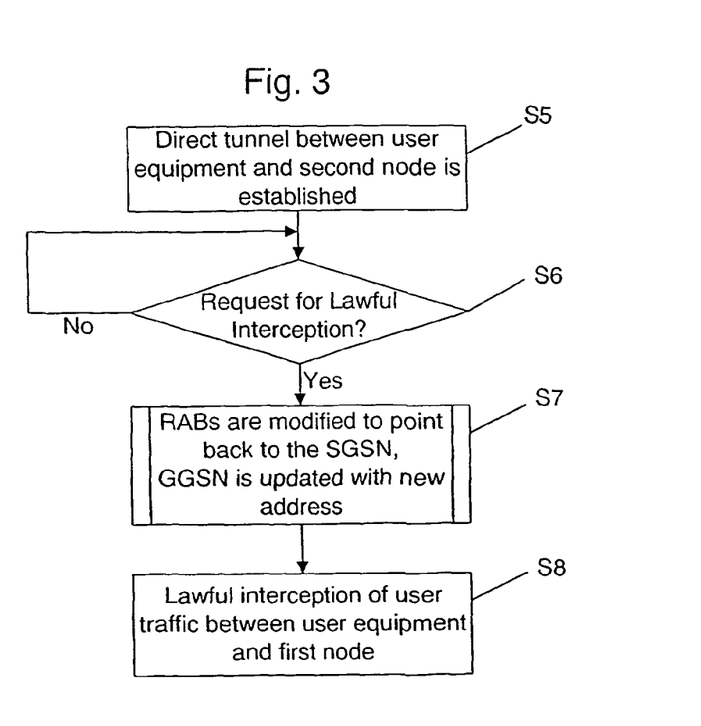
FIG. 3 shows a process flow in the same or a further embodiment of the invention.

FIG. 3 shows a process for handling a request for a Lawful Interception. Here, in the normal case, a split tunnel situation is present wherein the support node 3 has established a direct tunnel from base station 2 to support node 4. However, this tunnel is used only for user traffic, that is all data sent from and received by a user excluding control data, i.e. signalling data. The control data are still transmitted between base station 2 and support node 3. In order to provide this situation, the support node 3 gives the address of the support node 4 as user traffic address when reserving Iu bearers. Therefore, the RNC 2 still assumes that it is exchanging user data with the support node 3 although the actual user data tunnel directly goes to the support node 4. However, the control data is still transmitted to and handled by the support node 3.

In case of a request for a Lawful Interception (LI), see for instance the ETSI specification, the support node 3 preferably performs a radio access bearer modification (RANAP), requesting the change of the GTP tunnel(s) for one user. This tunnel(s) is then routed via the support node 3 so that now all data flow via this node 3 and Lawful Interception is possible by monitoring the data flowing via node 3. The tunnel endpoint address and TEID stored in GGSN is updated to the address and TEID of SGSN 3. Likewise, the RNC is updated to store the address and TEID of node 3 as tunnel endpoint address and TEID. Note that SGSN may have different TEIDs for uplink and downlink.

FIG. 3 shows this process in greater detail. In step S5, a direct tunnel related to a user (preferably only for user data but not for control data for always giving the support node 3 control over the data flow for redirecting same to itself) is established between RNC 2, respectively, and the second node 4. When a request for Lawful Interception is received by support node 3 for this user, step S6, the process proceeds to step S7. If no such request is received, the normal operation remains unchanged. In step S7, the direct tunnel existing between the user equipment (in more detail, the RNC 2) and the second node 4 is canceled. This may be effected by sending a request for changing the radio access bearer from node 3 to RNC 2, for instance by performing a RANAP radio access bearer modification, and by updating the address stored in node 4 to the address of node 3. This request demands a change of the user tunnel. The support node 3 now will give its own address as address of user packet data to be sent from and to RNC 2 and, thus, from and to user equipment 1. Now, all traffic including user data and control data are handled by the first node 3. Therefore, this node 3 can send all transmitted user data to a Lawful Interception gateway (LIG) such as defined in the ETSI standard, for instance. The Lawful Interception according to step S8 is now able to monitor the total communication sent and received from and by the user equipment 1.

Figure 4:
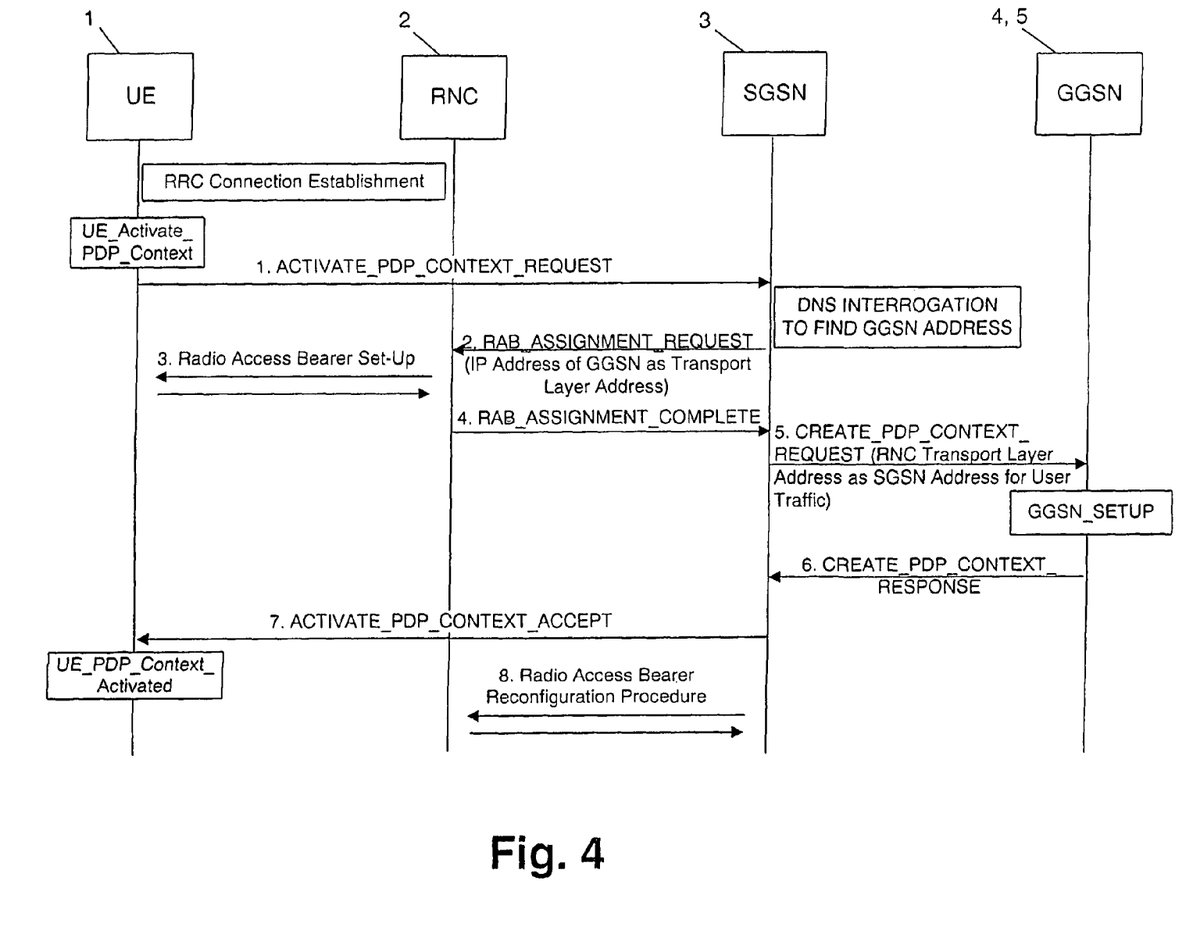
FIG. 4 illustrates the signalling data flow when attaching a user equipment to a telecommunication network.

FIG. 4 illustrates the signaling and control flow effected for establishing a direct tunnel between the user equipment 1 (or the control station RNC 2) and the second support node (GGSN) 4 when activating the user equipment. Before starting any L3 signaling, the RRC connection (receiver ready connection) has to be established in a known manner (see standards for RRC procedures). This RRC connection establishment may be performed before or after the decision of the user equipment 1 to activate a new context (see for instance standard ETSI EN 301 347). The signaling messages shown in FIG. 4 are as follows: Step 1.: the user equipment 1 sends an "activate PDP context request" to the first support node 3 which contains the data items Protocol Discrimator, Transaction Identifier, Activate PDP Context Request Message Identity, Requested NSAPI, Requested PDP Address including PDP Type, Quality of Service QoS requested, Protocol Configuration Option (optional), Access Point Name APN (optional), and further parameters. This message may be transparently encapsulated, on the Iu interface, in a RANAP direct transfer request message. There may also security procedures be carried out between the support node 3 and the user equipment 1.

The support node 3 checks the rights of the subscriber. When determining that the "activate PDP context request" is valid, the support node 3 derives the APN to be used and uses it to interrogate the DNS (Domain Name Server) functionality for learning the address of the associated second support node 4 which may be a gateway support node for communicating with other networks. The DNS functionality returns the IP (Internet protocol) address of the second support node 4. The first support node 3 creates a TEID for the tunnel. The support node 3 furthermore determines whether or not it has to downgrade the requested QoS.

Thereafter, the support node 3 decides whether or not the following steps 2. and 3. should be performed before or after steps 5. and 6. Preferably, the steps 2. and 3. are performed before the steps 5. and 6. as the controller 2 (which may e.g. be a radio network subsystem) and corresponds to RNC of FIG. 1) is more likely to downgrade the quality of service QoS than the second support node 4.

Step 2.: The support node 3 now sends a radio access bearer (RAB) assignment request to the user equipment access controller such as RNS, RNC or Serving RNC 2 which request corresponds to a PDP (packet data protocol) context activation request and contains the parameters IMSI, NSAPI, TEID for support node 3, the IP address of support node 3 (SGSN), QoS negotiated 1 (including reordering as required). In FIG. 4, support node 3 is designated as 3G-SGSN which specifies a third generation GPRS support node of an UMTS network. However, the support node 3 may also be of a different generation or of a general GSM type. The information sent in step 2. is used to set up a GTP (GPRS tunneling protocol) tunnel on the Iu interface. Normally, in GPRS phase 1, the reordering required is indicated by the gateway support node 4. However, here preferably the user equipment 1 requests a reordering required.

Step 3.: The base station 2 uses the radio access bearer set up procedure to indicate, to the user equipment UE 1, the new bearer ID (identification) established, and the corresponding NSAPI with RRC signaling. As the support node 3 does not necessarily need information on the bearer ID, this information is preferably exchanged directly between the base station 2 and the user equipment 1.

Step 4.: The base station 2 sends a RAB assignment complete message (i.e. PDP context activation response) to support node 3 informing same on the completed radio access bearer set up. This message contains the following parameters: TID, flow label downlink for RNC 2, IP address for RNC 2, QoS negotiated 2 (including reordering required). The GTP tunnel is now open on the Iu interface.

In step 5., the support node 3 now initiates the procedure for setting up of the GTP tunnel on the Gn interface, by sending a "create PDP context request" message to the second support node 4 which message contains information on the user PDP type and address, APN, QoS negotiated 2 (including reordering required), filter parameters, selection mode, as well as TEID downlink for RNC 2 and IP address of RNC 2. It should be noted that sending these two last parameters, instead of the SGSN ones is a novel feature. However, GGSN will not notice any difference. The data item "selection mode" indicates whether a subscribed APN was selected, or whether a non-subscribed APN sent by a mobile station such as user equipment 1, or a non-subscribed APN chosen by the first support node 3 was selected.

Step 6.: The support node 4 then replies with the "Create PDP Context Response" message which includes the IP address of support node 4, the TEID uplink for support node 4, the user PDP address, QoS negotiated 3 (including reordering required), PDP configuration options, and charging ID. Note that in case the QoS negotiated 3 is different from QoS negotiated 2, the support node 3 will probably renegotiate the Iu tunnel. However, this may not be necessary. Now, the GTP tunnel is open on the Gn interface.

It should be noted that as described earlier, this reply can activate a trigger, in particular if a certain feature such as data volume reporting is not supported by GGSN, or GTP version supported is not compatible with RNC.

Step 7.: Support node 3 sends an "activate PDP context accept" message to the user equipment containing NSAPI (or possibly TI), PDP type, address, QoS negotiated 3 and PDP configuration options. This message is relayed over the Iu interface as a direct transfer request message. Now, the user equipment 1 knows NSAPI, bearer ID and QoS profile for this bearer.

Step 8.: In parallel with step 7., the support node 3 sends a radio access bearer (RAB) establishment command for reconfiguration of the GTP tunnel on the Iu interface. The parameters are now IMSI, NSAPI, IP address of support node 4, TEID uplink for support node 4, QoS negotiated 3, and so on. The RNC 2 thus modifies the destination IP address and uplink TEID for this tunnel so that same is now directly open between RNC 2, that is the user equipment 1, and the second support node 4. The RNC 2 responds with a "RAB establishment complete" message to the first support node 3.

This procedure is optimizing the transport efficiency by having only one tunnel instead of two. Furthermore, the charge collection and registration is done in the second support node, that is only one node per PLMN (collected CDR is performed in only one node).

In the signaling chart of FIG. 4, steps 5. and 6. may also be performed after steps 2., 3., 4. In addition, the tunnel between the support nodes 3 and 4 may be modified at the end of the procedure.

For implementing the process of FIG. 2, the support node 3 may check, before effecting step 8., whether the second support node 4 is part of its own network, or part of a different PLMN belonging or not to preconfigured PLMN list. If support node 4 is part of the same network as support node 3, step 8. is effected as mentioned above. Otherwise, step 8 may be omitted. In addition, step 5. is then modified so as to indicate the TEID downlink for support node 3 (instead of RNC 2), and indicating the IP address of the support node 3 (instead of same of RNC 2). For optimizing the data handling, the check according to step S2 for FIG. 2 is preferably performed, by support node 3, before step 5.

For implementing the procedure of FIG. 3, the support node 3, when receiving a request for Lawful Interception as indicated in step S6, performs a renewed radio access bearer reconfiguration procedure similar to step 8. so as to reset the tunnel in such a manner that two tunnels are formed, one between RNC 2 and support node 3, and the second between support node 3 and support node 4.

Figure 5:
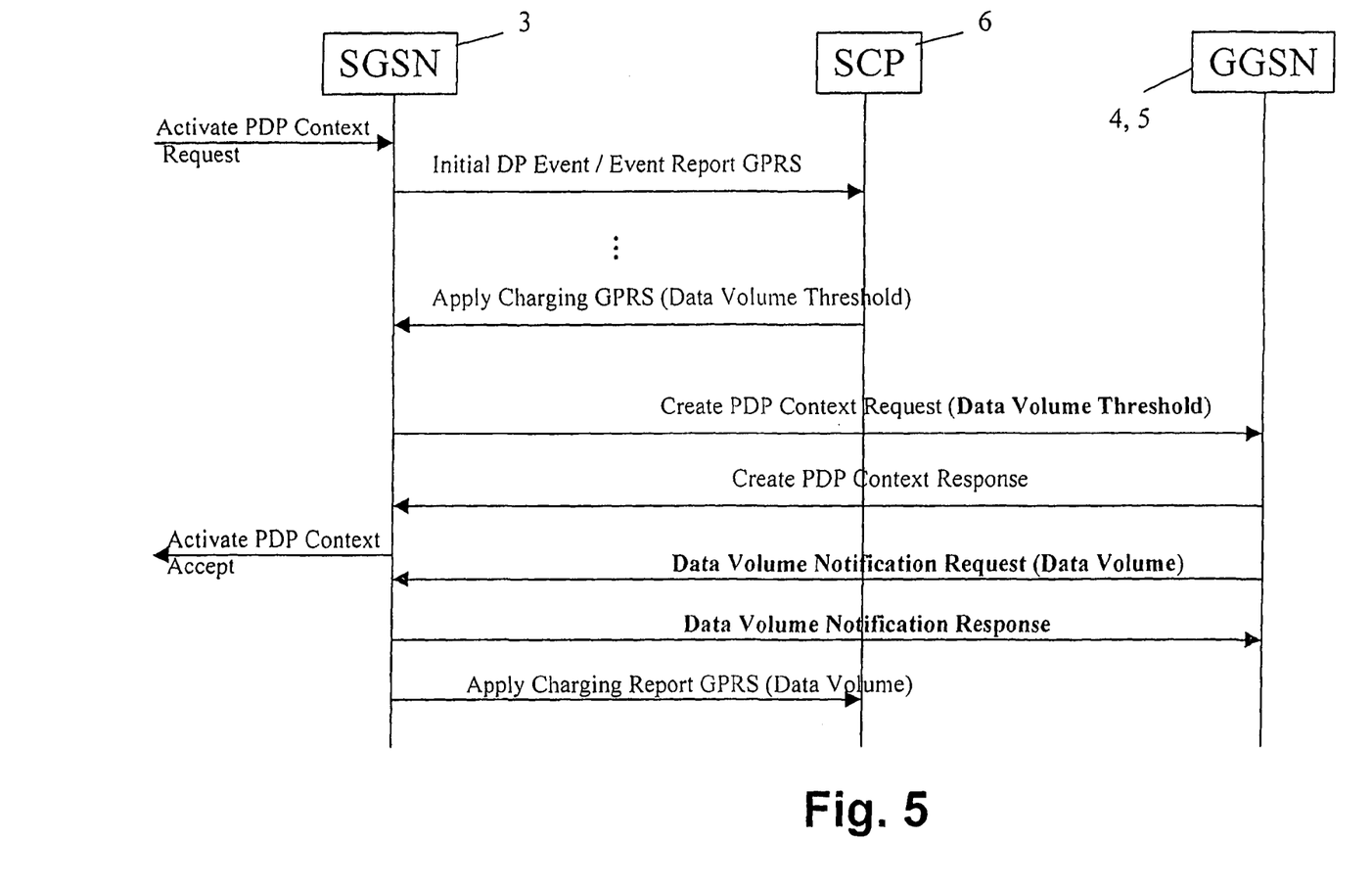
FIG. 5 shows the message flow to and between support nodes and a control point in another embodiment of the invention.

FIG. 5 shows details of a message flow in an embodiment of the invention which comprises a first support node 3 (SGSN), a second support node 4 or 5 (GGSN), and an additional controlling means 6 which here is implemented as a Service Control Point (SCP) of an Intelligent Network (IN). This embodiment provides a solution for e.g. correctly charging a subscriber having a prepaid account even when establishing a direct tunnel connection (GTP) in a CAMEL environment. Words printed in bold letters emphasize new functions or message contents.

When the SGSN 3 receives an "Activate PDP Context Request" from a User Equipment (UE), it sends a message "Initial DP Event/Event Report GPRS" to the SCP 6 which checks the conditions set for the UE.

The SCP 6 may send "Apply Charging GPRS (Data Volume Threshold)" to request data volume reporting from the SGSN 3. The SGSN 3 then addresses the GGSN 4 (or 5) with "Create PDP Context Request (Data Volume Threshold)" informing the GGSN 4 on the Data Volume Threshold sent from the SCP 6. The GGSN 4 performs the context creation steps and returns a "Create PDP Context Response". In the "Create PDP Context Response", the GGSN sends an indication on whether it supports data volume reporting. Thereupon, the SGSN 3 sends a message "Activate PDP Context Accept" to the UE.

The GGSN 4 informs the SGSN 3 on the data volume by sending a "Data Volume Notification Request (Data Volume)" The SGSN 3 acknowledges this message by returning "Data Volume Notification Response". Finally, the SGSN 3 sends a report "Apply Charging Report GPRS (Data Volume)" to the SCP 6 which updates. the subscriber account accordingly.

Figure 6:
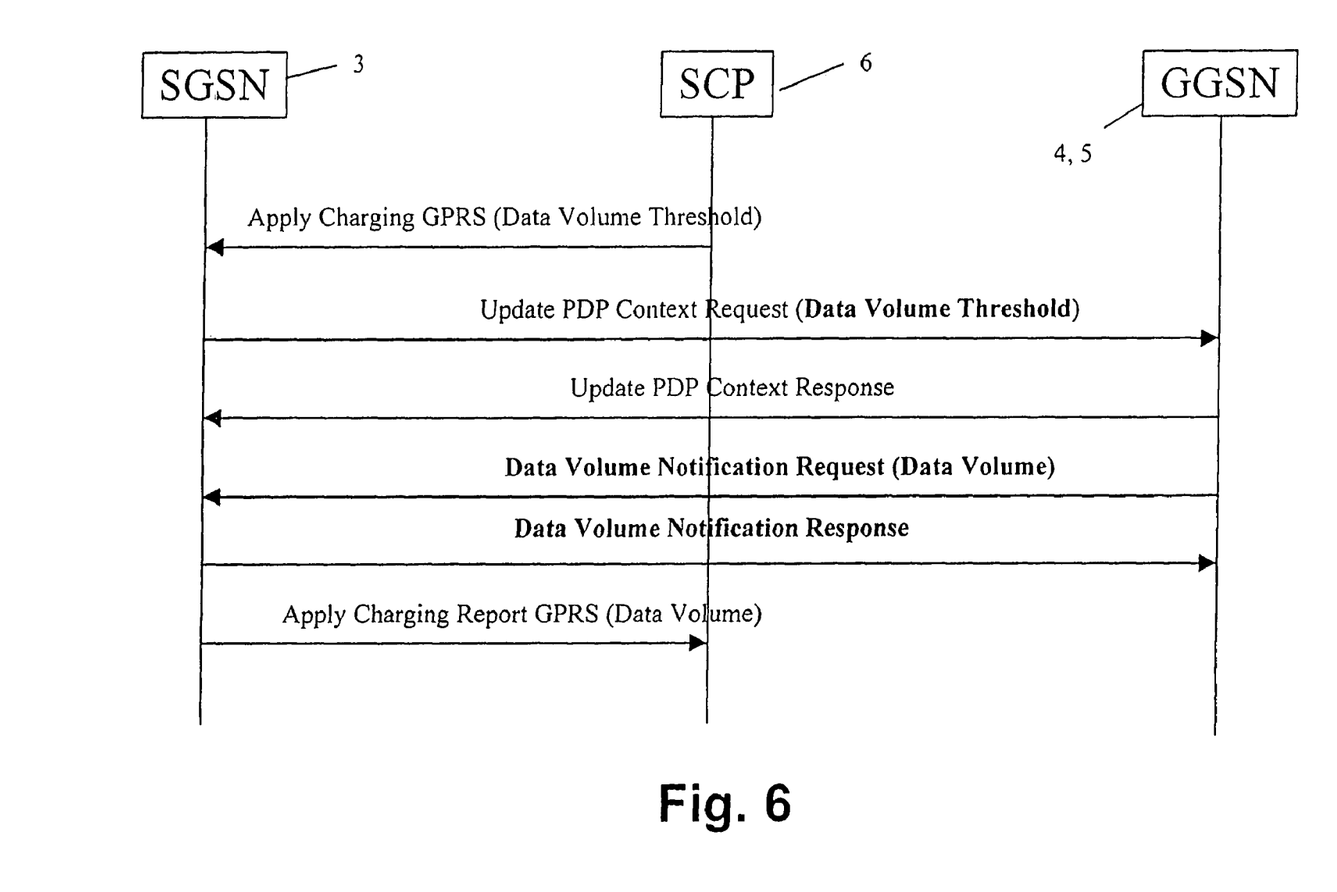
FIG. 6 shows the message flow to and between support nodes and a control point in a further embodiment of the invention.

FIG. 6 addresses a case where the charging criteria is reset or changed when having a one-tunnel solution. Similar to the embodiment of FIG. 5, this implementation comprises a first support node 3 (SGSN), a second support node 4 or 5 (GGSN), and an additional controlling means 6 which is a Service Control Point (SCP) of an Intelligent Network (IN).

When the SCP 6 determines the necessity of informing the SGSN on the data volume threshold allowed for a certain subscriber, e.g. because of recharging of the subscriber account, or because of change of the admissible data volume to be sent or received by a subscriber, or the SGSN 3 or the SCP 6 are updated or the like, the SCP 6 sends a message "Apply Charging GPRS (Data Volume Threshold)" to the SGSN 3 indicating the actually valid Data Volume Threshold. The SGSN 3 informs the GGSN 4 (or 5) thereon by sending an Update PDP Context Request (Data Volume Threshold)". The GGSN 4 stores this Data Volume Threshold and acknowledges the message by returning "Update PDP Context Response".

When the GGSN 4 wants to inform the SGSN 3 on the data volume transmitted or received by a user equipment performing a data transmission either at the end thereof or when reaching the indicated Data Volume Threshold, the GGSN 4 sends a "Data Volume Notification Request (Data Volume)" to the SGSN 3 including information on the transmitted and received data volume. The SGSN 3 acknowledges this message by returning a "Data Volume Notification Response", and sends an appropriate charging report message "Apply Charging Report GPRS (Data Volume)" to the SCP 6 for correctly charging the subscriber.

Figure 7:
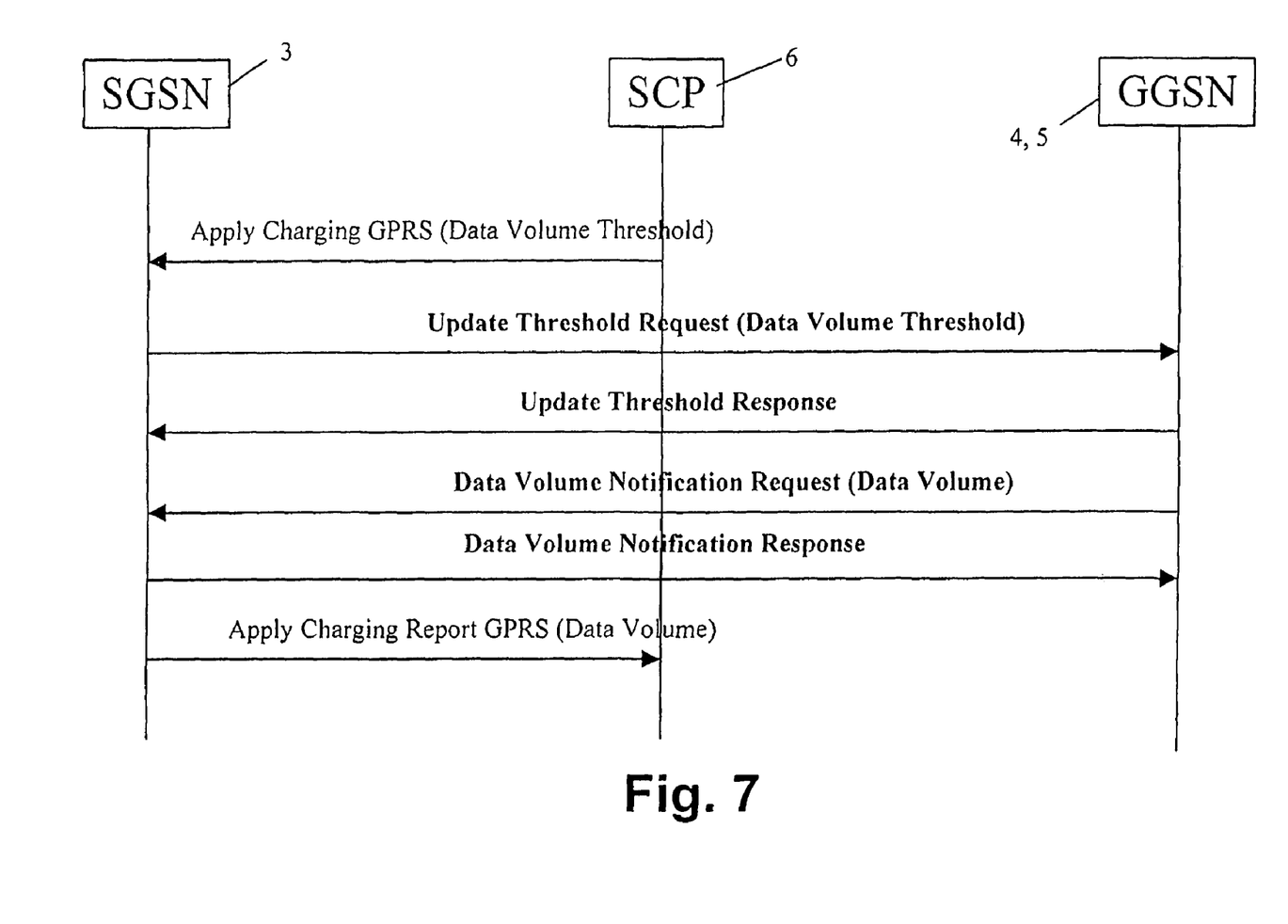
FIG. 7 shows an alternative of the message flow to and between support nodes and a control point in the embodiment according to FIGS. 5 and 6.

FIG. 7 illustrates an alternative to both cases of FIGS. 5 and 6. It is possible to add a new parameter, Data Volume Threshold, to existing messages (case shown in FIGS. 5 and 6) or to introduce new messages, Update Threshold Request and Update Threshold Response, to carry the new parameter. It is e.g. possible to send the data volume from the GGSN to the SGSN at PDP context deactivation, and/or at PDP context modification. This means adding the data volume parameter to existing messages. In such a case, it is not necessary to send the separate messages 'Data Volume Notification Request' and 'Data Volume Notification Response'.

Similar to the cases shown in FIGS. 5 and 6, the embodiment of FIG. 7 addresses a situation where the charging criteria is set, reset, or changed when having a one-tunnel solution. Similar to the embodiment of FIGS. 5 and 6, this alternative comprises the first support node 3 (SGSN), the second support node 4 or 5 (GGSN), and the additional controlling means SCP 6. The data volume threshold sent by the SCP applies to only one data report. If the SCP wants another report, even with the same data volume threshold value, it needs to ask it again.

When the SCP 6 determines the necessity of informing the SGSN 3 on the data volume threshold allowed for a certain subscriber, e.g. because of the above mentioned reasons, the SCP 6 sends a message "Apply Charging GPRS (Data Volume Threshold)" to the SGSN 3 indicating the Data Volume Threshold. The SGSN 3 informs the GGSN 4 (or 5) thereon by sending an Update Threshold Request (Data Volume Threshold)". The GGSN 4 stores this updated Data Volume Treshold and acknowledges the message by returning "Update Threshold Response". If the SGSN does not receive the acknowledgement message, it knows that the GGSN 4 (or 5) does not support data volume reporting.

Like in the case of FIGS. 5 and 6, when the GGSN 4 wants to inform the SGSN 3 on the data volume transmitted or received by a user equipment performing a data transmission either at the end thereof or when reaching the indicated Data Volume Threshold, the GGSN 4 sends a "Data Volume Notification Request (Data Volume)" to the SGSN 3 including information on the transmitted and received data volume. The SGSN 3 acknowledges this message by returning a "Data Volume Notification Response", and sends an appropriate charging report message "Apply Charging Report GPRS (Data Volume)" to the SCP 6 for correctly charging the subscriber.

At PDP context deactivation, the GGSN may send the data volume to the SGSN. As an alternative to the Data Volume Notification Request and the Data Volume Notification Response messages, the GGSN may send the data volume in the existing messages used e.g. for the PDP context deactivation. If the GGSN initiates the PDP context deactivation, the GGSN sends the data volume to the SGSN in the Delete PDP Context Request message. If the MS or the SGSN initiates the PDP context deactivation, the GGSN sends the data volume to the SGSN in the Delete PDP Context Response message.

The GGSN may send the current data volume to the SGSN if the data volume threshold changes. The GGSN may send the data volume in the messages used to acknowledge the new data volume threshold. The GGSN may send the data volume in the Update PDP Context Response message (FIG. 6) or in the Update Threshold Response message (FIG. 7).

The use of the invention is not limited to the above described cases, and is also applicable to cases where e.g. a serving node is implemented as a set of separate elements.

A first example of such implementation is to have part of the serving support node implemented in policy server. In particular, the check described in this invention may be implemented in such policy server.

A second example of such implementation is to have the serving support node implemented in two separate elements, one handling only the control data (server serving support node) and one handling the user plane (user data serving support node). In such implementation, the check described in this invention is used to determine if one tunnel (directly from RNC to gateway support node) or two tunnels (from RNC to user data serving support node and from user data serving support node to gateway support node) are established.

The invention claimed is:

1. A method comprising:
receiving a request from a user equipment, in a first support node of a communication network, to establish a connection to the network;
performing, in the first support node, a check of at least one trigger precluding establishment of a direct tunnel connection between a controller providing the access for the user equipment and a second support node of the same network; and
causing establishment of the direct tunnel connection between the controller and the second support node in an instance in which it is determined based at least in part on the check that none of the checked at least one trigger is met;
wherein the first support node and the controller are separate entities.

2. The method according to claim 1, wherein the direct tunnel connection is a tunnel used to transmit only user traffic data, and wherein signaling data is addressed from the user equipment to the first support node.

3. The method according to claim 1, wherein the direct tunnel connection is a tunnel used to transmit both signaling data and user data.

4. The method according to claim 1, further comprising:
checking whether the second support node is part of the same communication network; and
causing establishment of one of
a single direct tunnel connection, only when the second support node is part of the same communication network, and
two tunnels, a first tunnel from the user equipment to the first support node and a second tunnel from the first support node to the second support node, only in an instance in which it is determined based on the checking that the second support node is part of another communication network.

5. The method according to claim 1, further comprising:
checking whether the distance between the first and second support nodes is larger or smaller than a defined distance value; and
causing establishment of one of
a single direct tunnel connection, only when the distance between the first and second support nodes is smaller than the defined distance value, and
two tunnels, a first tunnel from the controller to the first support node, and a second tunnel from the first support node to the second support node, only in an instance in which it is determined based on the checking that the distance is larger than the distance value.

6. The method according to claim 1, further comprising:
checking whether or not lawful interception is activated for a user equipment; and
causing establishment of one of
a single direct tunnel connection, in an instance in which it is determined based on the checking that lawful interception is not activated for the user equipment, and
two tunnels, a first tunnel from the controller to the first support node, and a second tunnel from the first support node to the second support node, otherwise.

7. The method according to claim 1, further comprising:
checking whether or not one or more services activated for a given user will be provided even when causing establishment of a single direct tunnel connection; and
causing establishment of a single direct tunnel connection only when the one or more activated services are provided when having such a tunnel connection.

8. The method according to claim 1, further comprising:
checking whether or not interoperability between the second support node and the controller is ensured if a direct tunnel connection were to be established therebetween; and
causing establishment of the direct tunnel connection only when interoperability is ensured.

9. The method according to claim 8, wherein checking whether or not interoperability between the second support node and the controller is ensured if a direct tunnel connection were to be established therebetween comprises determining whether the second support node and the controller both support a same tunneling protocol version.

10. The method according to claim 1, further comprising:
checking whether or not the creation of a correct charging report is ensured when having a direct tunnel connection between the controller and the second support node; and
causing establishment of the direct tunnel only when the correct creation of a charging report is ensured.

11. The method according to claim 1, further comprising cancelling, in the first support node, an established direct tunnel connection in response to receiving a request for lawful interception of the user equipment, so that both the user traffic data as well as the signaling data are thereafter addressed to the first support node.

12. The method according to claim 11, further comprising effecting, in the first support node, a radio access bearer modification used to change the address of the user traffic data to its own address.

13. The method according to claim 1, further comprising causing establishment of the direct tunnel connection by giving the user traffic packet data sent from the user equipment the address of the second support node, and by giving the user traffic packet data sent from the second support node the address of the user equipment,
wherein a packet data transmission is effected.

14. The method according to claim 1, further comprising, in response to receiving a charging-related information from the controller, causing a message to be sent to the second support node informing the latter on the charging-related information, in the first support node.

15. The method according to claim 14, wherein the charging-related information is a data volume threshold.

16. The method according to claim 14, wherein the message is a create packet data protocol context request, an update packet data protocol context request, or an update threshold request.

17. The method according to claim 14, further comprising, in response to having received the message from the first support node, monitoring, in the second support node, a charge-related parameter, and returning charge-related information determined based at least in part on the monitored charge-related parameter to the first support node.

18. The method according to claim 14, further comprising returning the charging-related information in response to reaching a data volume threshold.

19. The method according to claim 14, further comprising returning the charging-related information in response to a change in the tunnel connection.

20. The method according to claim 14, further comprising returning the charging-related information in response to releasing the tunnel connection.

21. The method according to claim 14, further comprising returning the charging-related information or charge-related parameter in a data volume notification request message.

22. The method according to claim 14, further comprising acknowledging the charging-related information or charge-related parameter by a data volume notification response message.

23. The method according to claim 14, wherein the controller is a service control point.

24. The method according to claim 1, wherein the first support node comprises a serving general packet radio service support node, the second support node comprises a gateway general packet radio service support node, and the controller comprises a radio network controller.

25. An apparatus, comprising
a checking unit configured, in response to a received request from a user equipment to establish a connection to a communication network, to perform a check of at least one trigger precluding establishment of a direct tunnel connection between a controller providing the access for the user equipment and a support node of the same network; and
a tunneling unit configured to cause establishment of the direct tunnel connection between the controller and the support node in an instance in which it is determined based at least in part on the check that none of the checked at least one trigger is met;
wherein the apparatus and the controller are separate entities.

26. The apparatus according to claim 25, wherein the direct tunnel connection is a tunnel used to transmit both signaling data and user traffic data, or a tunnel used to transmit only user traffic data, the signaling data being addressed, in the latter case, from the user equipment to the apparatus.

27. The apparatus according to claim 25, wherein the checking unit is further configured to check whether the support node is part of the same communication network,
wherein the tunneling unit is further configured to cause establishment of a direct tunnel connection, only when the support node is part of the same communication network, and
wherein, in an instance in which it is determined that the second support node is part of another communication network, the tunneling unit is further configured to cause establishment of two tunnels, a first tunnel from the user equipment to the apparatus, and a second tunnel from the apparatus to the support node.

28. The apparatus according to claim 27, wherein the checking unit is further configured to cancel a direct tunnel connection between the user equipment and the support node in response to receiving a request for lawful interception of the user equipment, so that both the user traffic data as well as the signaling data are thereafter addressed to the apparatus.

29. The apparatus according to claim 27, wherein the checking unit is a service control point.

30. The apparatus according to claim 25, wherein the checking unit is further configured to check whether the distance between the first and second support nodes is larger or smaller than a defined distance value,
wherein the tunneling unit is further configured to cause establishment of a single direct tunnel connection only when the distance between the first and second support nodes is smaller than the defined distance value, and
wherein, in an instance in which it is determined that the distance is larger than the distance value, the tunneling unit is further configured to cause establishment of two tunnels, a first tunnel from the controller to the apparatus, and a second tunnel from the apparatus to the support node.

31. The apparatus according to claim 25, wherein the checking unit is further configured to check whether or not lawful interception is activated for a user equipment,
wherein the tunneling unit is further configured to cause establishment of a single direct tunnel connection only in an instance in which it is determined based on the checking that lawful interception is not activated for the user equipment, and
wherein the tunneling unit is further configured to cause establishment of two tunnels, a first tunnel from the controller to the apparatus, and a second tunnel from the apparatus to the second support node, otherwise.

32. The apparatus according to claim 25, wherein the checking unit is further configured to check whether or not one or more services activated for a given user will be provided even when establishing a single direct tunnel connection, and
wherein the tunneling unit is further configured to cause establishment of a single direct tunnel connection only when the one or more activated services are provided when having such a tunnel connection.

33. The apparatus according to claim 25, wherein the checking unit is further configured to check whether or not interoperability between the support node and the controller is ensured if a direct tunnel connection were to be established therebetween, and
wherein the tunneling unit is further configured to cause establishment of the direct tunnel connection only when interoperability is ensured.

34. The apparatus according to claim 25, wherein the checking unit is further configured to check whether or not the creation of a correct charging report is ensured when having a direct tunnel connection between the controller and the support node,
wherein the tunneling unit is further configured to cause establishment of the direct tunnel connection only when the correct creation of a charging report is ensured.

35. The apparatus according to claim 25, wherein the apparatus, in response to receiving a charging-related information from the controller, is configured to cause a message to be sent to the support node informing the latter on the charging-related information.

36. The apparatus according to claim 35, wherein the charging-related information is a data volume threshold.

37. The apparatus according to claim 35, wherein the message is a create packet data protocol context request, an update packet data protocol context request, or an-update threshold request.

38. The apparatus according to claim 35, wherein the support node is configured to monitor, in response to having received the message from the apparatus, a charge-related parameter, and to return charge-related information determined based at least in part on the monitored charge-related parameter to the apparatus.

39. The apparatus according to claim 35, wherein the charging-related information or charge-related parameter is returned in a data volume notification request message.

40. The apparatus according to claim 35, wherein the charging-related information is acknowledged by a data volume notification response message.

41. The apparatus according to claim 25, wherein the apparatus is configured to request the support node to send a data volume report once.

42. The apparatus according to claim 25, wherein the apparatus is configured to request the support node to send a data volume report each time a certain data volume is reached based on charging-related information received from a controller.

43. The apparatus according to claim 25, wherein the support node is configured to send data volume report if requested by the apparatus.

44. The apparatus according to claim 25, wherein the support node is configured to provide indication on the support of the data volume reporting by adding an indication in a response message.

45. The apparatus according to claim 25, wherein the support node is configured to provide data volume reporting based on data volume limit set by another node.

46. An apparatus comprising:
   means for receiving a request from a user equipment for establishing a connection to a communication network;
   means for performing a check of at least one trigger precluding establishment of a direct tunnel connection between a controller providing access for the user equipment and a support node of the same network; and
   means for causing establishment of the tunnel connection between the controller and the support node in an instance in which it is determined based at least in part on the check that none of the checked at least one trigger is met;
   wherein the apparatus and the controller are separate entities.

47. An apparatus comprising a receiver and at least one processor, wherein:
   the receiver is configured to receive a request from a user equipment to establish a communication to a communication network; and
   the at least one processor is configured to cause the apparatus to at least:
      perform, in response to the received request, a check of at least one trigger precluding establishment of a direct tunnel connection between a controller providing the access for the user equipment and a support node of the same network; and
      cause establishment of the direct tunnel connection between the controller and the support node in an instance in which it is determined based at least in part on the check that none of the checked at least one trigger is met;
   wherein the support node and the controller are separate entities.

* * * * *